(12) United States Patent
Chamberlin

(10) Patent No.: US 7,145,465 B2
(45) Date of Patent: Dec. 5, 2006

(54) LIQUID LEVEL SENSOR HAVING A VIRTUAL RING

(76) Inventor: Edward R. Chamberlin, c/o Standex Electronics, 4538 Camberwell Rd., Cincinnati, OH (US) 45209

(*) Notice: Subject to any disclaimer, the term of this patent is extended or adjusted under 35 U.S.C. 154(b) by 409 days.

(21) Appl. No.: 10/823,935

(22) Filed: Apr. 14, 2004

(65) Prior Publication Data

US 2004/0189478 A1    Sep. 30, 2004

Related U.S. Application Data

(63) Continuation-in-part of application No. 10/410,836, filed on Apr. 10, 2003, now Pat. No. 6,727,822, which is a continuation-in-part of application No. 10/184,010, filed on Jun. 27, 2002, now Pat. No. 6,624,755.

(51) Int. Cl.
  *G08B 21/00*    (2006.01)
(52) U.S. Cl. .............. 340/620; 340/618; 73/290 R; 73/304 R
(58) Field of Classification Search ............ 340/620, 340/618, 619, 621, 623, 624, 627, 612; 73/290 R, 73/291, 304 R
See application file for complete search history.

(56) References Cited

U.S. PATENT DOCUMENTS

| | | | | |
|---|---|---|---|---|
| 5,167,769 A | * | 12/1992 | Jack et al. | 162/238 |
| 5,907,112 A | * | 5/1999 | Queyquep | 73/866.5 |
| 6,938,478 B1 | * | 9/2005 | Arias | 73/304 R |

* cited by examiner

*Primary Examiner*—Toan N. Pham
(74) *Attorney, Agent, or Firm*—William B. Ritchie

(57) ABSTRACT

A liquid level sensor for conductive liquids having a virtual bias ring to prevent false "full" indications. The sensor is an inexpensive conductive probe that can be installed in any tank or container used to contain a conductive liquid. The build up of residue such as conductive fluid that fails to drain on the inside of the container wall and probe pieces can cause a short between the probe and ground. This situation will result in falsely showing that the level of the liquid being measured is at least at the minimum predetermined requirement even though the actual level may be far less than that amount. The bias ring is a virtual "ring" that is provided around the insulating base of the sensing probe between the probe tip and the top inside of the tank. The probe is then given a charge (positive for negative ground systems) which interrupts the current path between the sensing tip of the probe and ground via the conducting residue. Consequently, the sensor will read correctly despite the conductive residue that may be present.

4 Claims, 2 Drawing Sheets

LIQUID LEVEL SENSOR HAVING A VIRTUAL RING

This application is a continuation-in-part of U.S. patent application Ser. No. 10/410,836, filed Apr. 10, 2003 now U.S. Pat. No. 6,727,822, which is a continuation-in-part of U.S. patent application Ser. No. 10/184,010, filed Jun. 27, 2002, now issued as U.S. Pat. No. 6,624,755 on Sep. 23, 2003.

FIELD OF THE INVENTION

This invention relates to a liquid level sensor, in particular, the use of a conductance measuring sensor to determine the level of a conductive liquid contained within a vessel.

BACKGROUND OF THE INVENTION

The use of devices to indicate the level of liquid within a tank or container is well known in the art. The need for knowing whether a liquid in a container is above or below a predetermined level is found in many very different situations. Typical of those situations where the liquid level must not be permitted to fall below a predetermined level are found in automobile radiators, windshield washer containers or oil in an engine crankcase. The situation where the level can be too high is also common such as found with a recreational vehicle holding tank. Applications for such equipment is also found in industry where frequently the liquid in question is extremely caustic as experienced with chemical reagent reservoirs which must be filled once the chemical has fallen below a particular amount in order to keep a process running.

A typical float-type of liquid level sensor is disclosed in U.S. Pat. No. 4,386,337 issued to Todd on May 31, 1983. This device is said to be useful for measuring the level of oil in an engine crankcase or transmission fluid in a reservoir. An electrically conductive float disposed within an encapsulator and movably responsive to the liquid level is provided. This movement is then determined. The problem associated with sludge buildup resulting in shorts bypassing the proper electrical pathways is not directly discussed. While Todd does suggest that by having his encapsulator with open upper and lower ends provides for self-flushing of debris, it is unclear how this can inhibit or stop the problems associated with residue formation, particularly as found in older systems.

The type of devices used to measure the liquid level also varies substantially. The use of floats, changes in capacitance, optical readers, weight measurements of the liquid are just a few examples of techniques that have been adopted to serve as an indicator of the surface level of a liquid. Some devices have attempted to utilize non-invasive measures, that is, a sensor that is outside of the liquid container.

Representative of this genre is U.S. Pat. No. 4,749,988, issued to Berman et al. on Jun. 7, 1988. The '988 Patent discloses the use of a pair of conductive band electrodes oriented in parallel so that the gap between the electrodes corresponds to the liquid surface level to be measured. The change in capacitance between the electrodes as the liquid level rises and falls serves as the indicator. While this device solves the corrosive problem found in processing industries using materials in liquid form, its use is limited to containment vessels which have sufficient outside room to put the sensor in place. Further, this type of sensor is expensive to manufacture in that it must be shaped to correspond to the particular shape of the vessel being used. Also, the thickness and material used for the vessel can also appreciably impact the accuracy and sensitivity of the device. Whether this will also solve the problem of residue buildup on the inside of he container is not know as Berman et al. does not discuss this issue.

U.S. Pat. No. 5,315,872, issued to Moser on May 31, 1994, discloses a liquid level sensor for an electrically conductive liquid. The device requires the use of an electrically conductive material for constructing the tank. Thus, many commonly used containers are unsuitable for use with this device without having substantial additional expense. A voltage source supplies an electrical charge to the tank walls, with ground potential being supplied to the liquid contained therein. The capacitance between the tank walls and liquid varies with the volume of liquid in the tank. The problem of false "full" readings is not discussed.

One of the potentially simplest and least expensive methods for the measurement of the level of a liquid is the use of an electrically conductive liquid as a part of a resistive circuit to ascertain the level. Representative of this genre is found in U.S. Pat. No. 4,277,773, issued to Blatnik on Jul. 7, 1981. This reference discloses a device for measuring the level of cooling liquid within a radiator. The radiator is grounded and an insulated probe is installed in the radiator and measures the level via interconnecting the sensor with the ground to obtain a conductivity measurement. A second sensor is provided to measure a hot liquid level in the same manner. While this device is simple and inexpensive to build, no protection against false "full" readings due to the accumulation of conductive sludge or other residue is disclosed or suggested.

U.S. Pat. No. 5,719,556, issued to Albin et al. on Feb. 17, 1998, discloses still another variation of a liquid level sensor that utilizes the measurement of resistance as an indicator. Albin et al. does recognize the problem of shorts from the sensor tip to ground via a conductive path through sludge. However, the inventors claim that merely insulting the sensing rods except at the tip will eliminate this problem. Further, their device is quite complicated and expensive requiring the use of alternating current, an oscillator, and filters as well as other circuitry in order to achieve their objectives.

Therefore, a simple conductive-type of liquid level sensor for highly conductive fluids such as dishwasher soap that is easy and inexpensive to manufacture, can be attached in a variety of tanks and containers without substantial modification of those tanks and prevent false "full" indications due residue buildup is not found in the prior art.

SUMMARY OF THE INVENTION

It is an aspect of the invention to provide a liquid level sensor that prevents false "full" indications due to the buildup of residue on the inside of the container.

It is another aspect of the invention to provide a liquid level sensor that provides a virtual bias ring that is electrically charged the same polarity as the tip of the probe of the sensor so as to prevent a current path being established between probe tip and ground via any residue buildup on the probe or by the highly conductive nature of the liquid itself inside of the container.

It is an aspect of the invention to provide a liquid level sensor that can be used with any highly conductive liquid that has a level that needs to be determined, that is, where the liquid has a conductivity of approximately 50,000 microsiemens/cm or greater that is experienced with typical dishwasher soap.

It is also an aspect of the invention to provide a liquid level sensor that can be used with a liquid having of conductivity of approximately 1,000 to 10,000 micro-siemens/cm such as hard water that is encountered in sump pump applications.

It is still another aspect of the invention to provide a liquid level sensor that can be inexpensively manufactured.

Another aspect of the invention is to provide a liquid level sensor which is a conductive-type of design.

It is an aspect of the invention to provide a liquid level sensor that can be used where the liquid and its container are not preferably in contact with an electrical ground.

Finally, it is an aspect of the invention to provide a liquid level sensor that works equally as well in conductive liquid situations which are either positively or negatively grounded by correspondingly adjusting the bias voltage of the probe virtual bias ring.

The invention is a liquid level sensor apparatus for determining the level of a conductive liquid held within a container having inside walls, one of which is an attachment wall, wherein the container is subject to the accumulation of residue as a consequence of the liquid contained therein. A housing which is attached to attachment wall of the container is provided. An insulated probe having an attachment end and a sensor end is also provided, wherein the attachment end of said insulated probe is connected to said housing such that the probe end is able to contact the conductive liquid held therein. A conducting sensor tip having a voltage is disposed at the probe end of said insulated probe. A ground connection having an electrical polarity, said ground connection is in contact with the conductive liquid. An exposed tip of a bias wire exits from said insulated probe positioned between said attachment end and said sensor end. A bias voltage at said exposed tip provides a virtual bias voltage circumferential ring around said insulated probe immediately adjacent to said exposed tip. The bias voltage of the virtual bias voltage circumferential ring has a polarity opposite of said ground connection wherein the bias voltage corresponds to the voltage of said conducting sensor tip. Once the liquid is in contact with said conducting sensor tip at a predetermined level, a circuit is completed to said ground connection which indicates a "full" condition. If the liquid is not in contact with said conducting sensor tip at the predetermined level, a "not full" condition is indicated. The bias voltage of said virtual circumferential ring prevents a false indication of a "full" condition by preventing the completion of the circuit from said conducting sensor tip to said ground connection via residue on the container walls and said insulated probe even when the liquid is not in contact with said conducting sensor tip.

DETAILED DESCRIPTION OF THE INVENTION

Figure 1:
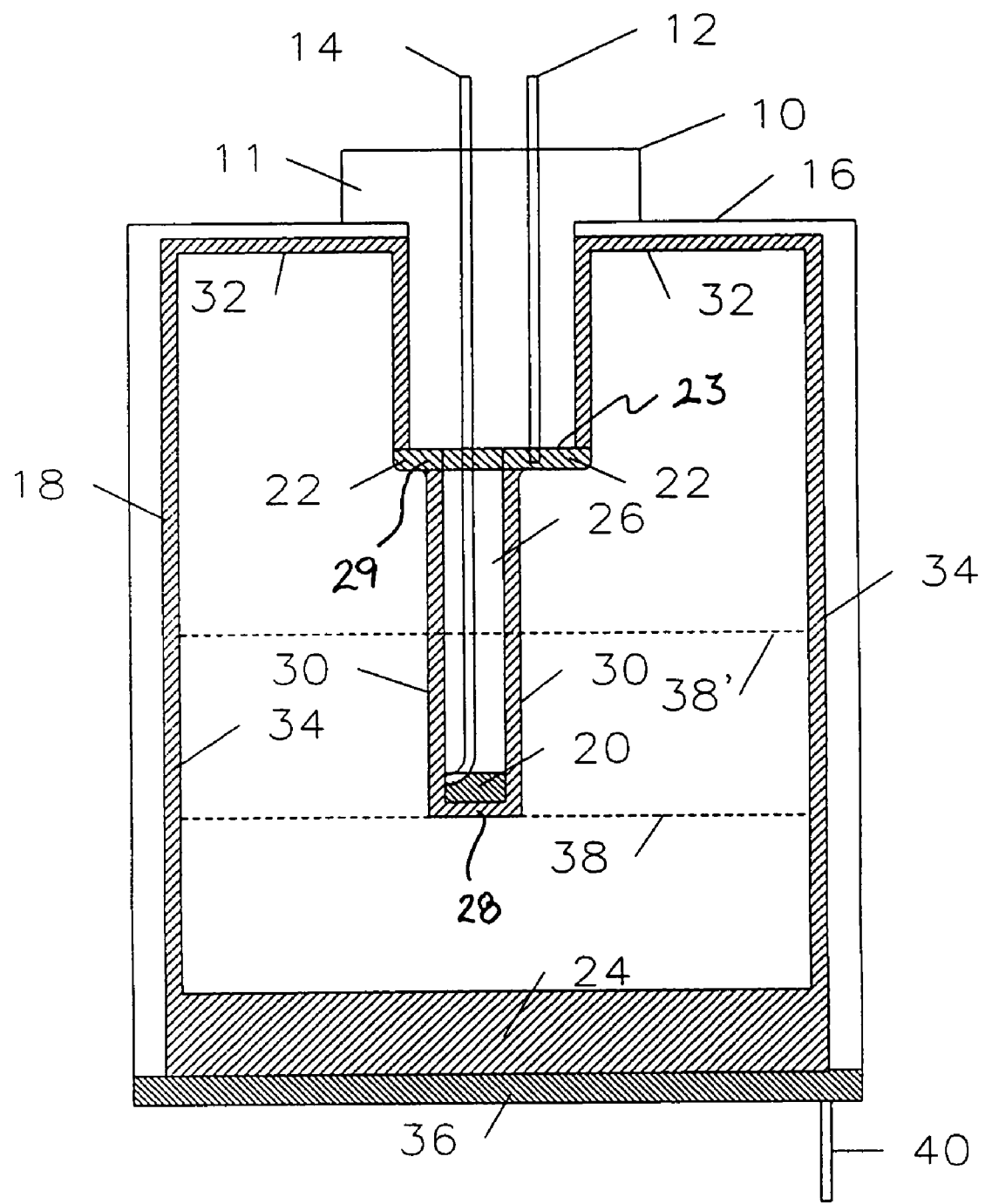
FIG. 1 is an illustration of the liquid level sensor in accordance with the invention.

Referring first to FIG. 1, an illustration of the sensor 10 is shown. The invention is a liquid level sensor that prevents a false "full" reading due to the build-up of conductive residue 18. Residue 18 usually consists primarily of the highly conductive liquid 24 that fails to drain from the inside of tank 16. In this case, liquid 24 is typically dishwasher soap or hard water that may be encountered in sump pump applications. This type of situation typically worsens in aging systems due to fluid contamination by metals and salts in the system.

Tank 16 holds liquid 24 which must be maintained below or at a predetermined level 38. As noted above, many elaborate schemes have been developed to determine when liquid 24 is less than level 38. However, the least expensive of these is a simple conductive circuit having a sensor that causes a light or other indicator well known in the art to be either activated or deactivated once the liquid level is below or at level 38.

As shown, sensor 10 features an insulated rod 26 which has an exposed metal probe tip 20 at the end. Sensor 10 can be inserted into the top or side (not shown) of tank 16. The length of insulated rod 26 determines the point at which liquid level 38 is to be considered low and needing attention. The liquid 24 is electrically grounded through base 36 of tank 16 via ground connection 40.

Figure 2:
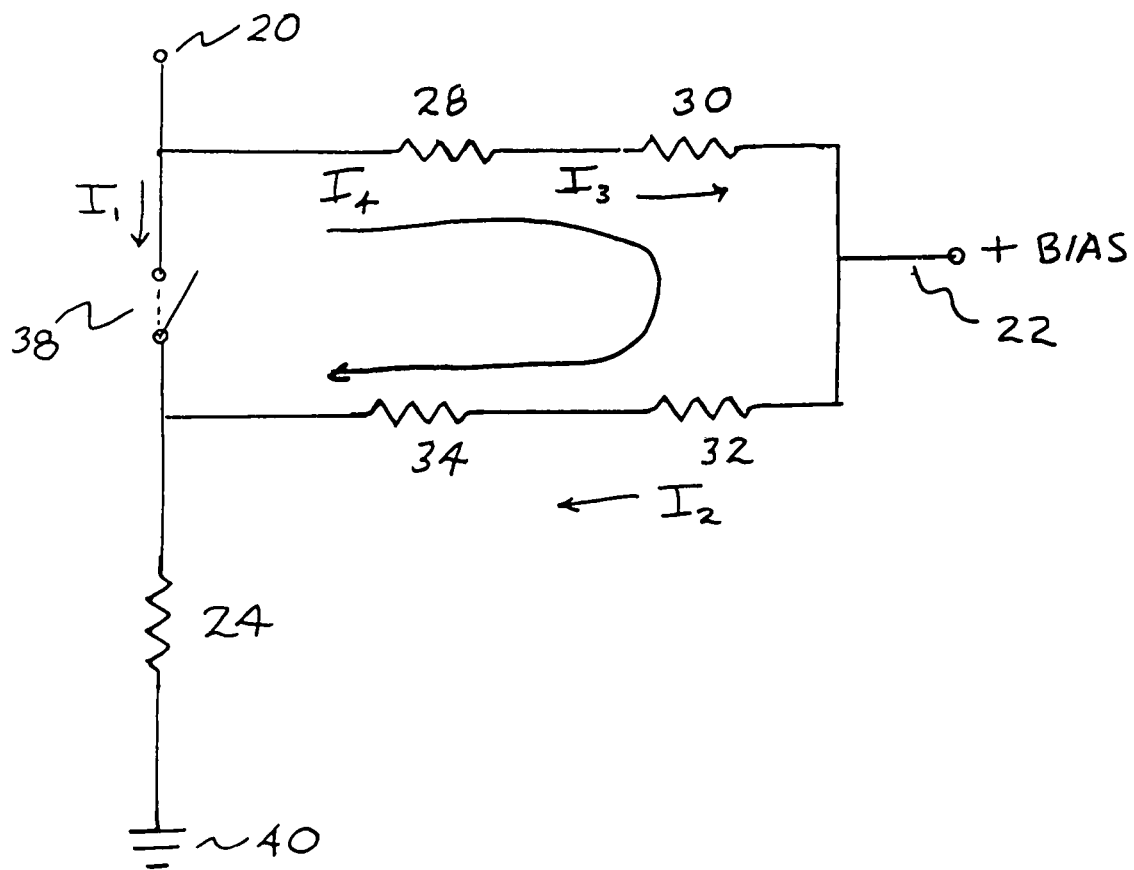
FIG. 2 is an equivalent schematic diagram of the apparatus shown in FIG. 1.

Referring now to FIG. 2, the operation of sensor 10 is shown. First, consider the conductive circuit in the absence of conductive residue 18 on the inside of tank 16 and on sensor 10. Probe tip 20 connects the sensor 10 to the fluid ground 40 via conducting fluid 24 if the liquid level is greater than or equal to level 38. Level 38 is depicted as a "switch". Thus, the circuit is completed and the voltage potential of sensor tip 20 swings from a plus potential to ground, thus indicating that liquid 24 is at least at the predetermined minimum, that is, "full".

Again in the absence of conductive residue 18, if the liquid level falls below 38, this behaves as an open "switch" 38, current $I_1$ would be broken. Thus, a "low" liquid level is detected.

However, the presence of residue 18 causes a conductive path to be obtained through conducting residue 18 as resistances 28, 30, 32, 34. These resistances act as series of resistors, from probe tip 20 to electrical ground 40 providing current $I_4$. Note that resistances in FIG. 2 correspond to the locations of residue 28, 30, 32, 34 in FIG. 1. This buildup of conductive residue causes sensor 10 to indicate a false "full" even when liquid 24 falls below level 38 as shown in FIG. 1. since residue 18 acts as a short circuit.

However, by providing a virtual circumferential ring 22 around the outside of insulated rod 26 between probe tip 20 and the top of tank 16, the false "full" indication due to the conducting residue 18 is eliminated. As long as the positive voltage potential of bias voltage 22 is at least as great as the positive voltage potential of probe tip 20, current $I_3$ will be substantially zero. Thus, bias 22 acts to prevent probe tip 20 from incorrectly swinging from plus to ground as if liquid 24 were in contact with probe tip 20. Thus, sensor 10 will properly indicate a "low" condition exists as if the conductive residue 18 were not present.

If the level of liquid 24 again rises to touch probe tip 20, then probe tip 20 voltage will be very close to ground potential because current $I_1$ will follow the path of least resistance (shortest path) through the mass of conductive liquid 24. Some extraneous current 12 will flow from bias 22 to ground 40 through the residue 32, 34 but this will not affect the probe tip 20 potential. An external means (not shown) may be used to limit this current using techniques well known in the art if that is desired.

The above explanation assumes that conducting liquid 24 causes probe tip 20 to be negative when in contact with liquid 24. Therefore, the bias ring 22 should be positively charged. If the opposite were true, i.e., conducting liquid 24 caused probe tip 20 to be positive when touched by conducting liquid 24, then bias ring 22 should be correspondingly negatively charged.

A further embodiment of sensor 10 is provided when insulated rod 26 has a substantially larger diameter from the exposed tip of wire 12 to the shelf base 23 than the smaller diameter from exposed tip of wire 12 to probe tip 20. This creates shelf base 23 at the junction of the two diameters where exposed tip of wire 12 exits. Fluid residue 29 tends to collect on shelf base 23 providing a conductive path (virtual bias ring) enabling bias voltage 22 to function as noted above. This embodiment is especially suited for applications where the conductivity of fluid 24 ranges from 1,000 to 10,000 micro-siemens/cm.

Although the present invention has been described with reference to certain preferred embodiments thereof, other versions are readily apparent to those of ordinary skill in the art. Therefore, the spirit and scope of the appended claims should not be limited to the description of the preferred embodiments contained herein.

What is claimed is:

1. A liquid level sensor apparatus for determining the level of a conductive liquid held within a container having inside walls, one of which is an attachment wall, wherein the container is subject to the accumulation of residue as a consequence of the liquid contained therein, said sensor comprising:

a housing which is attached to an attachment wall of the container;

an insulated probe having an attachment end and a sensor end, wherein the attachment end of said insulated probe is connected to said housing such that the probe end is able to contact the conductive liquid held therein;

a conducting sensor tip having a voltage and disposed at the probe end of said insulated probe;

a ground connection having an electrical polarity, said ground connection being in contact with the conductive liquid;

an exposed tip of a bias wire which exits said insulated probe positioned between said attachment end and said sensor end such that a bias voltage at said exposed tip provides a virtual bias voltage circumferential ring around said insulated probe immediately adjacent to said exposed tip; wherein the bias voltage of the virtual bias voltage circumferential ring has a polarity opposite of said ground connection wherein the bias voltage corresponds to the voltage of said conducting sensor tip;

wherein once the liquid is in contact with said conducting sensor tip at a first predetermined level, a circuit is completed to said ground connection which indicates a "full" condition and wherein if the liquid is not in contact with said conducting sensor tip at the second predetermined level, a "not full" condition is indicated, and wherein the bias voltage of said virtual circumferential ring prevents a false indication of a "full" condition by preventing the completion of circuit from said conducting sensor tip to said ground connection via residue on the container walls and said insulated probe even when the liquid is not in contact with said conducting sensor tip.

2. The liquid level sensor apparatus of claim 1 wherein said housing further comprises a larger diameter region extending from the attachment end to the exposed tip of said bias wire which exits said housing and a smaller diameter region extending immediately adjacent from the exit point of the exposed tip of said bias wire to conducting sensor tip such that the two different diameter regions of said housing provide a shelf which tends to collect conductive liquid which assists in providing said virtual circumferential ring.

3. The liquid level sensor of claim 2 wherein said larger and smaller diameter regions of said housing are integral with one another.

4. The liquid level sensor of claim 2 wherein said first and second predetermined levels are substantially the same.

* * * * *